United States Patent [19]

Krivanek, III

[11] 4,120,331

[45] Oct. 17, 1978

[54] LOW PRESSURE GAS REGULATOR

[76] Inventor: Charles S. Krivanek, III, 2443 Vauxhall Rd., Union, N.J. 07083

[21] Appl. No.: 796,028

[22] Filed: May 11, 1977

[51] Int. Cl.[2] .......................... B08B 9/08; F16K 9/00

[52] U.S. Cl. ....................................... 141/66; 422/99; 116/114 PV; 134/169 R; 137/240; 137/247.15; 137/433; 141/95; 141/303

[58] Field of Search ............ 116/114 PV; 137/247.13, 137/247.15, 433, 240; 141/95, 66, 303; 134/169 R

[56] References Cited

U.S. PATENT DOCUMENTS

| | | | |
|---|---|---|---|
| 582,623 | 5/1897 | Dolley | 141/48 |
| 3,118,735 | 1/1964 | Favre et al. | 23/232 R X |

*Primary Examiner*—Martin P. Schwadron
*Assistant Examiner*—Richard Gerard
*Attorney, Agent, or Firm*—Norman N. Popper; Daniel H. Bobis

[57] ABSTRACT

A low pressure gas regulator for purging vessels in which valve means first connects a vessel to be purged with a vacuum pump, and then when the vessel is substantially evacuated, it connects the evacuated vessel with a source of purging gas.

8 Claims, 2 Drawing Figures

LOW PRESSURE GAS REGULATOR

BACKGROUND OF INVENTION

1. Field of the Invention

This invention relates generally to low pressure gas regulators, and particularly to a low pressure gas regulator for purging a vessel of gas, and charging it with another gas.

2. Prior Art

There has been a long-felt need for a simple low pressure gas regulator by means of which vessels may be evacuated and recharged with a purging gas. Numerous elaborate systems have been known, but none have been suitable for laboratory use, nor have there been any which have been simple in character. For example, reference is made to Smith U.S. Pat. No. 2,522,969 of Sept. 19, 1950; Jonas U.S. Pat. No. 2,711,842 of June 26, 1955; Gutter U.S. Pat. No. 3,164,170 of Jan. 5, 1965. None of these devices are primarily suited for laboratory use which would allow an operator to remove an undesirable atmosphere from an apparatus or vessel and substitute a desirable atmosphere. There appears to be no known simple, foolproof apparatus which requires but little attention from the operator, and needs but the operation of a single valve to accomplish its purpose. Moreover, existing systems may utilize large quantities of purging gas before the objective is accomplished. It is often desirable to effect economies under such circumstances.

SUMMARY OF THE INVENTION

It has been found that a relatively simple glass system can be devised which in a highly effective manner will purge a vessel or other apparatus of undesirable gaseous content and substitute therefor, a gaseous atmosphere of desired character. Such a device can be operated with a minimum of effort, requires only the operation of one valve, and is not wasteful of the costly purging gases. Moreover, the operation of the system under the prescribed circumstances does not generate a pressure greater than 1 mm. Hg. Moreover, the apparatus is compatible with almost all gases except such gases which are corrosive to glass. Being made of glass, all activity is at all times visible. The apparatus consists of pairs of conduits, leading to a two-way valve. One of the conduits is an exhaust, and the other conduit is a supply or intake conduit. These conduits may be successively connected to another conduit which is attached to a vessel to be exhausted. The valve successively connecting the pairs of conduits is adjustable so as first to connect the exhaust conduit to the vessel, and second to connect the purging or intake conduit to the vessel. On the intake conduit, there is a relief or indicating valve which functions to prevent a purged vessel from being recontaminated and also functions to allow the discharge of purging gas when a vessel is being evacuated.

THE DRAWINGS

These objects and advantages as well as other objects and advantages may be attained by the device shown by way of illustration in the drawings.

PREFERRED EMBODIMENT

Figure 2:
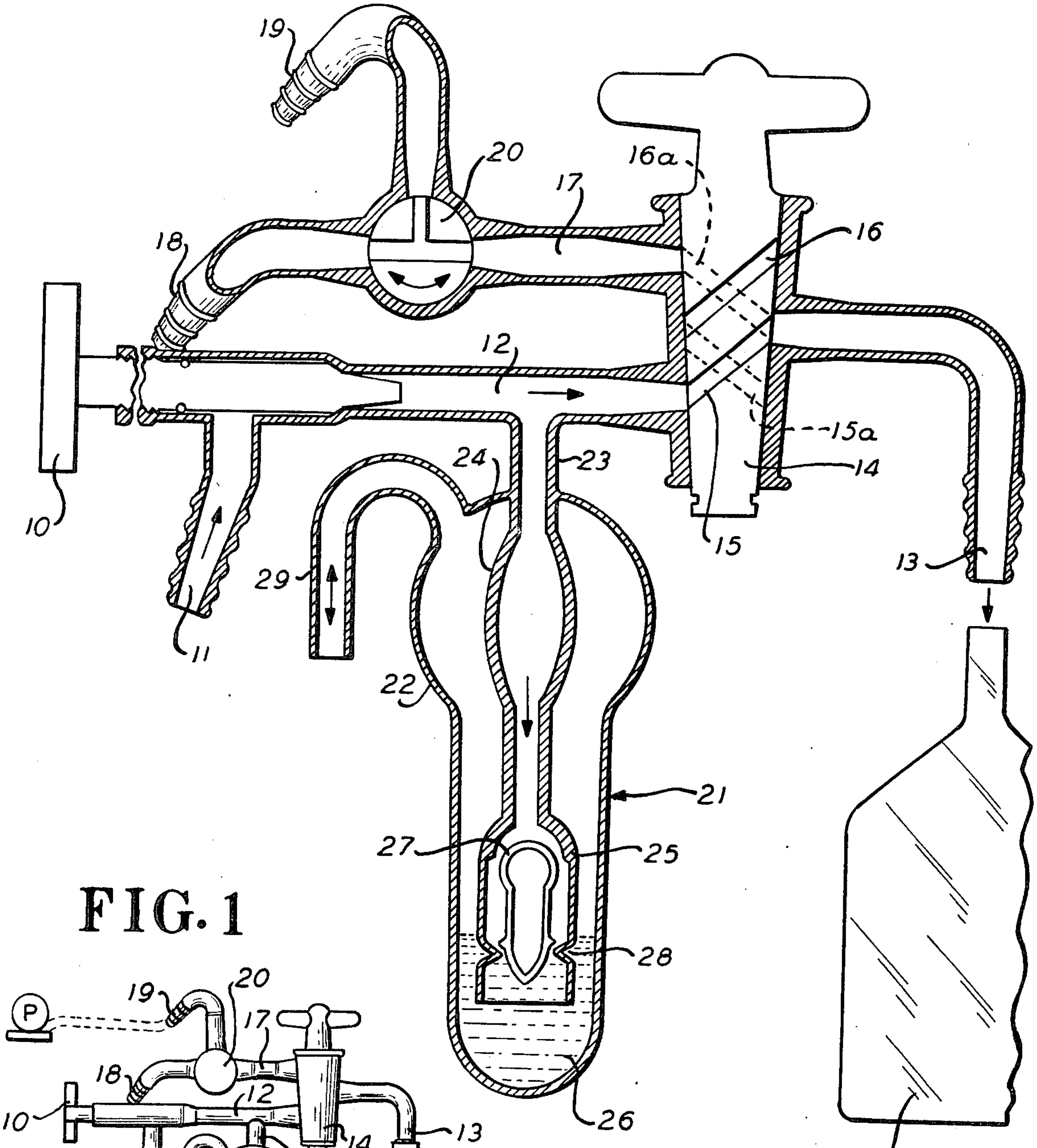
FIG. 2 is a vertical, elevational, sectional view showing the internal construction thereof.
Figure 1:
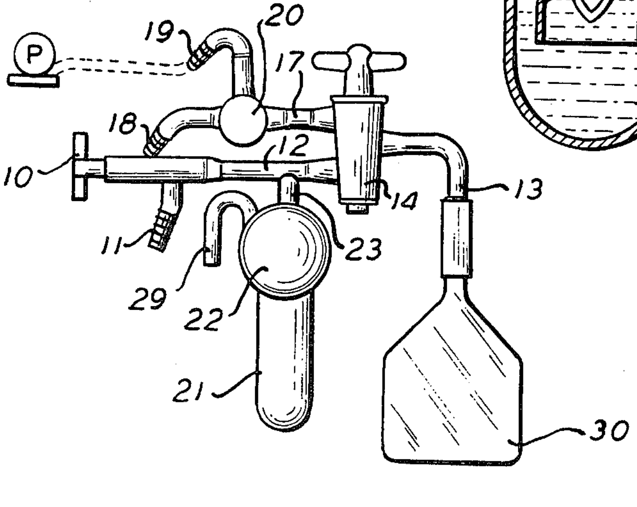
FIG. 1 is a schematic view of the low pressure gas regulator.

Referring now to the drawings in detail, the low pressure gas regulating device is made of glass and provides a gas intake conduit or port 11 communicating with a main passage 12 of an intake conduit. A valve 10 is arranged in threaded engagement with the main passage 12 and obstructs the entry of gas through the intake port 11 into the main passage 12. The main passage 12 communicates with an outlet conduit or port 13. Intervening between the main passage 12 and the outlet port 13 is a double oblique stop cock 14. A first passage 15 communicates between the main passage 12 and the outlet port 13 to allow the entrance of gaseous material from the intake port 11 to the outlet port 13 when the first passage is in registration with the main passage 12 and the outlet port 13. A second passage 16 is arranged in general parallelism with the first passage 15 and when the first passage is in conductive position or non-obstructing position as previously described, the second passage 16 is blocked by the walls of the stop cock 14. When the stop cock 14 is turned 180°, the first passage assumes the position shown by the dotted lines **15*a* and blocks the main passage 12 from communication with the outlet port 13. In that position, the second passage 16 assumes the position shown by the dotted lines 16*a* and permits communication between the outlet port 13 and the exhaust passage 17 so that gaseous material can be vented through the outlet port into the exhaust passage 17**.

The exhaust passage 17 communicates with a first gas discharge port 18 and a second gas discharge port 19. For venting of gaseous material from the exhaust passage 17 into either of the gas exhaust or discharge conduits 18, 19 a T bore stop cock 20 controls the discharge of gaseous material from the exhaust passage 17 so that the exhaust passage 17 may communicate either with the first gas discharge port 18 or the second discharge port 19. The T stop cock 20 may also assume an additional position wherein the exhaust passage 17 communicates with both the first and second gas discharge ports 18, 19 so that vented gas may be discharged from both.

Communicating with the main passage 12, there is an indicating gravity valve 21. This external valve has an enlargement 22 through which there extends downwardly, a conduit 23 which reaches toward but not to the bottom of the indicating gravity valve 21. This conduit 23 has a bulbous first internal enlargement 24 in the conduit 23, and a second enlargement 25 near the bottom of the conduit 23. The first bulbous enlargement 24 is intended to provide space for any material that may be drawn up into the conduit 23 by augmenting its volumetric capacity. Thus, oil 26 or some other liquid deposited in the bottom of the indicating gravity valve 21, might be drawn up into the conduit 23 and the enlargement 24 provides sufficient additional capacity beyond the normal capacity of the conduit to retain such oil and prevent it from being drawn up into the main passage 12. The second enlargement 25 encloses a floatable plug 27 which is normally seated on a constriction 28 in the second enlargement 25. Thus, should the pressure in the main passage 12 be such as to draw the oil 26 up into the conduit 23, the plug 27 will rise and block the entry of substantial amounts of oil 26 into the upper portion of the conduit 23. The enlargement 22 is provided with a downwardly extending vent passage 29 to permit the pressure in the main passage 12 to fall below the ambient pressure and draw up the plug 27 into sealing relationship with the conduit 23. Likewise, excess pressure in the main passage 12 will not cause the rupture of the apparatus because it may be vented through the conduit 23, passing through the oil 26 and out the vent passage 29. Thus by this means the gaseous input through the intake port 11 cannot be contaminated by the atmosphere.

The low pressure gas regulating device is operated as follows. A hose communicating with a source of gas is connected to the gas intake port 11 with the valve 10 in closed position. A hose is connected to the outlet port 13 and the other end of that hose is connected to a vessel 30 to be purged. The valve 10 is operated to permit the entry of gaseous material into the main passage 12, and the flow is regulated to a desired degree by the valve 10. The rate of flow is determined by inspection of bubbling observed through the oil 26 in the bottom of the indicating gravity valve 21, for the plug 27 is on the seat defined by the constriction 28 and permits gaseous material to pass around itself, up into the enlargement 22 and out the vent passage 29. When the gaseous flow has been determined to be sufficient by inspection of the bubbling of the oil 26, the next step may be pursued. A slow flow through the oil 26 is suitable for purging a small vessel, while a much more vigorous flow through the oil 26 is suitable for purging a large vessel.

An exhaust pump (not shown) is connected by a suitable hose to the second gas discharge port 19 and the T bore stop cock is adjusted so that the exhaust passage 17 is connected to the second gas discharge port 19 and the first gas discharge port 18 is blocked. The double oblique stop cock 14 is then adjusted to connect the outlet port 13 with the exhaust passage 17, and the vessel 30 connected to the outlet port 13 is evacuated. Then the stop cock 14 is rotated 180° to connect the first passage 15 with the main passage 12 and the outlet port 13. The purging gaseous material then is not vented through the vent passage 29 for the differential low pressure in the evacuated vessel causes the plug 27 to rise and block the conduit 23, until the purging gaseous material flows through the main passage 12, passes through the first passage 15 in the double oblique stop cock 14, and charges the vessel through the outlet port 13. When the vessel to be purged is charged with gaseous material, the gas pressure once more acts on the plug 27 restoring it to seating enagement with the constriction 28 and it flows out through the oil 26 into the vent passage 29. When this occurs, the operator knows that the vessel to be purged has been charged with purging gas.

If it is desired to improve the degree of purging, since the evacuation of the vessel to be purged is not absolute to the amount of 100%, a second cycle is resorted to wherein any residual unevacuated gaseous material in the vessel to be purged is withdrawn along with the purging gas and a further charge of purging gaseous material delivered to the vessel to be purged. This accomplishes a closer approach to 100% purging. Even third or fourth steps may be pursued although the degree of purging may not be vastly increased beyond that which was attained in the second step.

Attention is directed to the first gas discharge port 18, which may be utilized to repressurize the system outwardly from the double oblique stop cock 14, in order to easily remove the tubing. This is accomplished by rotating the double oblique stop cock 14 to close off the exhaust passage 17 from the outlet port 13, and then rotating the T bore stop cock 20 so that the gaseous discharge port 18 is connected directly to the second gas discharge port 19, thus relieving the vacuum in the system. A further use for the first gas discharge port 18 is to adjust the T bore stop cock to connect both the gas discharge port 18 and the second gas discharge port 19 with the exhaust passage 17 as shown in FIG. 2. This permits noxious fumes originating in a vessel 30 to be purged to be drawn into the pump and discharged into a suitable absorbent or deactivating medium.

What is claimed:

1. A low pressure gas regulator for purging vessels comprising:

(a) an outlet-conduit for gas,
(b) an intake-conduit for gas,
(c) an exhaust-conduit for gas,
(d) a first valve means having passages therein alternatively connecting the intake and exhaust conduits to the outlet conduit,
(e) an indicating valve connected to the intake conduit for receiving at least part of the gas from the intake conduit,
(f) a conduit in the indicating valve communicating with the intake conduit and extending toward the bottom of the indicating valve.
(g) a liquid at the bottom of the indicating valve covering the bottom of the conduit,
(h) a float captured in the bottom of the conduit,
(i) a vent passage in the indicating valve opening the indicating valve to ambient pressure,
(j) the float functioning as a check valve in response to the liquid level in the conduit to block the passage of gaseous material up the conduit in the indicating valve, and into the intake conduit when the liquid rises in the conduit when closed, and to pass gaseous material down through the conduit in the indicating valve when open; the passage of bubbles through the liquid providing an indication of the pressure condition in the intake conduit for gas.

2. A low pressure gas regulator for purging vessels comprising:

(a) the device according to claim 1, and
(b) a second valve for opening and closing the exhaust conduit for gas.

3. A low pressure gas regulator for purging vessels comprising:

(a) the device according to claim 1, and
(b) a third valve communicating with the intake conduit for regulating the input of gaseous material.

4. A low pressure gas regulator for purging vessels comprising:-

(a) the device according to claim 3, and
(b) a source of purging gas connected to the third valve,

5. A low pressure gas regulator for purging vessels comprising:

(a) the device according to claim 1, and
(b) a vacuum pump connected to the exhaust conduit.

6. A low pressure gas regulator for purging vessels comprising:

(a) the device according to claim 1 in which,
(b) the liquid at tbe bottom of the indicating valve is viscous.

7. A low pressure gas regulator for purging vessels comprising:

(a) the device according to claim 1,
(b) a vessel for purging attached to the outlet conduit.

8. A low pressure gas regulator for purging vessels comprising:

(a) an outlet-conduit for gas, (b) an intake-conduit for gas, (c) an exhaust-conduit for gas, (d) a first valve means having passages therein alternatively connecting the intake and exhaust conduits to the outlet conduit, (e) an indicating valve connected to the intake conduit for receiving at least part of the gas from the intake conduit, (f) a conduit in the indicating valve communicating with the intake conduit and extending toward the bottom of the indicating valve, (g) a liquid at the bottom of the indicating valve covering the bottom of the conduit, (h) a float captured in the bottom of the conduit, (i) a second valve for opening and closing the exhaust conduit for gas, (j) a third valve communicating with the intake conduit for regulating the input of gaseous material, (k) a source of purging gas connected to the third valve, (l) a vacuum pump connected to the exhaust conduit, (m) the liquid at the bottom of the indicating valve is viscous, (n) a vessel for purging attached to the outlet conduit, (o) a vent passage in the indicating valve opening the indicating valve to ambient pressure, (p) the float functioning as a check valve in response to the liquid level in the conduit to block the passage of gaseous material up the conduit in the indicating valve, and into the intake conduit when the liquid rises in the conduit when closed, and to pass gaseous material down through the conduit in the indicating valve when open; the passage of bubbles through the liquid providing an indication of the pressure condition in the intake conduit for gas.

* * * * *